(12) United States Patent
Fukushima et al.

(10) Patent No.: US 8,213,118 B2
(45) Date of Patent: Jul. 3, 2012

(54) MAGNETIC RECORDING MEDIUM, METHOD FOR PRODUCTION THEREOF AND MAGNETIC RECORDING AND REPRODUCING DEVICE

(75) Inventors: Masato Fukushima, Ichihara (JP); Akira Sakawaki, Ichihara (JP); Yasumasa Sasaki, Tokyo (JP)

(73) Assignee: Showa Denko K.K., Tokyo (JP)

( * ) Notice: Subject to any disclaimer, the term of this patent is extended or adjusted under 35 U.S.C. 154(b) by 841 days.

(21) Appl. No.: 12/279,214

(22) PCT Filed: Feb. 13, 2007

(86) PCT No.: PCT/JP2007/052901
§ 371 (c)(1),
(2), (4) Date: Jan. 15, 2009

(87) PCT Pub. No.: WO2007/094481
PCT Pub. Date: Aug. 23, 2007

(65) Prior Publication Data
US 2009/0290250 A1   Nov. 26, 2009

Related U.S. Application Data

(60) Provisional application No. 60/774,665, filed on Feb. 21, 2006.

(30) Foreign Application Priority Data

Feb. 14, 2006 (JP) .................................. 2006-036956

(51) Int. Cl.
*G11B 5/82* (2006.01)
(52) U.S. Cl. ............................ 360/135; 360/75; 360/110

(58) Field of Classification Search ................... 360/135, 360/75, 110
See application file for complete search history.

(56) References Cited

U.S. PATENT DOCUMENTS

| | | |
|---|---|---|
| 5,372,843 A | 12/1994 | Miyamura et al. |
| 5,571,591 A | 11/1996 | Brady et al. |
| 5,585,140 A | 12/1996 | Brady et al. |
| 5,968,679 A | 10/1999 | Kobayashi et al. |
| 7,067,207 B2 | 6/2006 | Kamata et al. |
| 7,147,790 B2 | 12/2006 | Wachenschwanz et al. |
| 7,470,474 B2 | 12/2008 | Sakawaki et al. |
| 7,521,135 B2 | 4/2009 | Morikawa et al. |
| 2003/0072971 A1* | 4/2003 | Fukutani et al. ......... 428/694 IS |

(Continued)

FOREIGN PATENT DOCUMENTS

JP   05-109047 A   4/1993

(Continued)

*Primary Examiner* — Huan Hoang
(74) *Attorney, Agent, or Firm* — Sughrue Mion, PLLC

(57) ABSTRACT

A discrete track-type magnetic recording medium (30) includes a nonmagnetic substrate (1), a magnetic recording track and a servo signal pattern which are provided on at least one side of the nonmagnetic substrate, and a nonmagnetic part (4) consisting of a nonmagnetic alloy containing Si for physically separating the magnetic recording track and the servo signal pattern. A magnetic recording and reproducing device comprising, in combination, the magnetic recording medium (30), a driving part (26) serving to drive the magnetic recording medium in a direction of recording, a magnetic head (27) composed of a recording part and a reproducing part, a device (28) to impart motion to the magnetic head relative to the magnetic recording medium, and a recording and reproducing signal processing device (29) for entering a signal into the magnetic head and reproducing an output signal from the magnetic head.

1 Claim, 1 Drawing Sheet

U.S. PATENT DOCUMENTS

| | | |
|---|---|---|
| 2003/0104253 A1* | 6/2003 | Osawa et al. .......... 428/694 TM |
| 2005/0014028 A1 | 1/2005 | Umeda et al. |
| 2005/0036223 A1 | 2/2005 | Wachenschwanz et al. |
| 2005/0053803 A1 | 3/2005 | Umeda et al. |
| 2005/0136291 A1 | 6/2005 | Okamoto et al. |

FOREIGN PATENT DOCUMENTS

| | | |
|---|---|---|
| JP | 06-103574 A | 4/1994 |
| JP | 2004-164692 A | 6/2004 |
| JP | 2004-178793 A | 6/2004 |
| JP | 2004-178794 A | 6/2004 |
| JP | 2004-310910 A | 11/2004 |
| JP | 2005-108347 A | 4/2005 |
| TW | 200501083 A | 1/2005 |
| TW | 200540820 A | 12/2005 |
| TW | 248062 I | 1/2006 |
| WO | 2005/120176 A2 | 12/2005 |

* cited by examiner

MAGNETIC RECORDING MEDIUM, METHOD FOR PRODUCTION THEREOF AND MAGNETIC RECORDING AND REPRODUCING DEVICE

CROSS REFERENCE TO RELATED APPLICATIONS

This application is an application filed under 35 U.S.C. §111(a) claiming the benefit pursuant to 35 U.S.C. §119 (e) (1) of the filing dates of Provisional Application No. 60/774,665 filed Feb. 21, 2006 and Japanese Patent Application No. 2006-36956 filed Feb. 14, 2006 pursuant to 36 U.S.C §111 (b).

TECHNICAL FIELD

This invention relates to a magnetic recording medium for use as in a hard disk drive, a method for the production thereof, and a magnetic recording and reproducing device.

BACKGROUND ART

In recent years, as magnetic recording devices, such as magnetic disk drives, flexible disk drives and magnetic tape drives, have immensely expanded their ranges of utility and gained in significance, efforts have been directed toward enabling the magnetic recording media used in these drives to be prominently improved in recording density. Particularly, the increase in surface recording density has been further growing in ardency since the introduction of the Magnet Resistive (MR) head and the Partial Response Maximum Likelihood (PRML) technique. Owing to the further introduction of the Giant-Magnet Resistive (GMR) head and the Tunneling Magneto Resistive (TMR) head in recent years, the increase is continuing at a pace of about 100% per year. These magnetic recording media are being urged to attain a still higher recording density in future and their magnetic recording layers to accomplish addition to coercive force, Signal to Noise Ratio (SNR) and resolution. Recent years have been witnessing efforts that are being continued with the object of enhancing the linear recording density and adding to the surface recording density by increasing the track density as well.

In the latest magnetic recording devices, the track density has reached 110 kTPI. As the track density is further increased, it tends to entail such problems as causing interference between the parts of data magnetically recorded in adjacent tracks and inducing the magnetization transition region in the borderline region to constitute a noise source and impair the SNR. This fact hinders the enhancement of the recording density because it immediately results in lowering the bit error rate.

For the sake of increasing the surface recording density, it is necessary that the individual recording bits on the magnetic recording medium be formed in as minute a size as possible and enabled to secure as large saturated magnetization and magnetic film thickness as permissible. As the recording bits further decrease in size, however, they tend to entail such problems as lessening the minimum volume of magnetization per bit and inducing extinction of recorded data through the magnetization reversal caused by thermal fluctuation.

Further, since the track pitch grows small, the magnetic recording device necessitates a tracking servo mechanism of extremely high accuracy and, at the same time, generally needs adoption of the method of executing the recording in a large width and executing the reproducing in a smaller width than during the recording with a view to eliminating the influence from the adjacent tracks to the fullest possible extent. Notwithstanding that this method is capable of suppressing the influence between the adjacent tracks to a minimum, it entails such problems as rendering sufficient acquisition of the output of reproduction difficult and consequently incurring difficulty in securing a sufficient SNR.

As one means to cope with the problem of thermal fluctuation and accomplish acquisition of due SNR or a sufficient output, an attempt to enhance the track density by forming irregularities along the tracks on the surface of the recording medium and consequently physically separating mutually the adjacent tracks is now under way. This technique will be referred to as a "discrete track method" and the magnetic recording medium that is produced by this technique will be referred to as a "discrete track medium" herein below.

As one example of the discrete track medium, a magnetic recording medium that is formed on a nonmagnetic substrate bestowed on the surface thereof with irregular patterns and enabled to acquire physically separated magnetic recording track and servo signal pattern has been known (refer, for example, to JP-A 2004-164692).

This magnetic recording medium has a ferromagnetic layer formed on the surface of a substrate possessing a plurality of irregularities on the surface thereof via a soft magnetic layer and has a protecting film formed on the surface of the ferromagnetic layer. This magnetic recording medium has formed in the convexed regions thereof magnetic recording regions magnetically divided from the environments.

According to this magnetic recording medium, it is held that a high-density magnetic recording medium issuing no great noise can be formed because the fact that the occurrence of magnetic walls in a soft magnetic layer can be suppressed results in preventing the influence of thermal fluctuation from readily appearing and allowing extinction of interference between the adjacent signals.

The discrete track method is known in two kinds, i.e. a method which forms a track subsequent to forming a magnetic recording medium consisting of a number of stacked thin films and a method which forms a thin-film magnetic recording medium either directly on the surface of a substrate or subsequent to forming irregular patterns on a thin-film layer ready for the formation of a track (refer, for example, to JP-A 2004-178793 and JP-A 2004-178794). The former method, often called a magnetic layer processing type, is at a disadvantage in suffering the medium to be readily contaminated during the course of production and greatly complicating the process of production as well because it requires the physical processing of surfaces to be carried out subsequent to the formation of the medium. The latter method, often called an emboss processing type, though not inducing ready contamination during the course of production, is at a disadvantage in disabling stabilization of the posture and the height of floatation of the recording and reproducing head adapted to execute recording and reproducing while floating on the medium because the irregular shape formed on the substrate is fated to continue existence on the film to be formed.

The emboss processing-type method of production enables no easy realization of a flat surface because the irregular shape formed on the substrate is overlaid with the magnetic layer and the protecting layer and is consequently suffered to continue the existence thereof to the surface to be completed.

On the other hand, the discrete track-type recording medium by the magnetic layer processing-type method adopts a procedure of forming the magnetic layer used for recording on the surface of the substrate and subsequently forming a magnetic pattern and, therefore, acquires a structure that results from executing pattern formation by the imprinting method utilized as for semiconductors, subsequently dry-etching the part fated to form a nonmagnetic part, thereafter embedding $SiO_2$ or a carbon-based nonmagnetic material, subjecting the resultant surface to a planarizing treatment, further coating the surface with a protecting film layer, and forming a lubricating layer thereon. This magnetic etching-type discrete track medium complicates the process of production and not only forms a cause for contamination but also fails to realize a flat surface.

Generally, the magnetic recording medium of such a structure as this enables enlarging the output and input signals through the head and heightening the recording density as well because the distance from the head to the magnetic layer decreases in accordance as the protecting film layer becomes thin. The pit density in the track is decided by the height of floatation of the head running on the surface of the protecting film layer of an irregular shape. How the floatation of the head is stably retained, therefore, constitutes an important task for the sake of accomplishing a high recording density. It is therefore required that the irregular pattern is capable of allowing the floatation of the head to be stably retained, enabling the head to approximate as closely to the magnetic layer as possible, and moreover preventing mutual interference of signals on the adjacent tracks.

However, a technique for producing a discrete track medium that entails scarcely the risk of causing contamination during the course of production and enables formation of a flat surface has not been proposed to date.

This invention is directed, in the magnetic recording device confronting technical difficulty in consequence of the increase in the track density, toward immensely increasing the track density and consequently increasing the surface recording density while ensuring acquisition of higher recording and reproducing properties than ever. Particularly in the discrete track-type magnetic recording medium adapted to execute formation of concaves and convexes subsequent to having a magnetic layer formed on a substrate, this invention is directed toward providing a method for production that exceptionally simplifies the process of production as compared with the conventional process of the magnetic layer processing-type by depriving this conventional process of a step for removing the magnetic layer and sparingly entails the risk of causing contaminants and toward a discrete track-type magnetic recording medium that excels in the head-floating property and proves to be useful.

DISCLOSURE OF THE INVENTION

The present invention provides as the first aspect thereof a discrete track-type magnetic recording medium comprising a nonmagnetic substrate, a magnetic recording track and a servo signal pattern provided on at least one side of the nonmagnetic substrate, and a nonmagnetic part consisting of a nonmagnetic alloy containing Si for physically separating the magnetic recording track and the servo signal pattern.

The second aspect of the invention includes the magnetic recording medium according to the first aspect, wherein the substrate has surface roughness Ra satisfying $0.1 \text{ nm} \leq Ra \leq 2.0 \text{ nm}$.

The third aspect of the invention includes the magnetic recording medium according to the first or second aspect, wherein the magnetic recording track is a perpendicular magnetic recording track.

The present invention also provides as the fourth aspect thereof a method for the production of a discrete track-type magnetic recording medium provided on at least one side of a nonmagnetic substrate with a magnetic recording track and a servo signal pattern which are physically separated, comprising the steps of forming an Si film on a magnetic layer, heating the resultant magnetic layer or irradiating a surface of the Si film with inert ions to diffuse Si in the magnetic layer, thereby forming in the magnetic layer a nonmagnetic part of a nonmagnetic alloy containing Si for physically separating the magnetic recording track and the servo signal pattern.

The present invention further provides as the fifth aspect thereof a magnetic recording and reproducing device comprising, in combination, the magnetic recording medium according to any one of the first to third aspects, a driving part serving to drive the magnetic recording medium in a direction of recording, a magnetic head composed of a recording part and a reproducing part, means to impart motion to the magnetic head relative to the magnetic recording medium, and recording and reproducing signal processing means for entering a signal into the magnetic head and reproducing an output signal from the magnetic head.

This invention, in a magnetic layer processing-type discrete track magnetic recording medium, enables provision of a magnetic recording medium that permits securing stability of head floatation, possesses an excellent track separating property, avoids succumbing to the influence of signal interference between the adjacent tracks, and excels in a high recording density property. Further, since this invention permits omission of a dry etching step serving to remove the magnetic layer processing-type magnetic layer hitherto held to entail an extremely complicated process of production, it is capable of contributing greatly to the enhancement of productivity.

The magnetic recording and reproducing device of this invention, owing to the use of the magnetic recording medium contemplated by this invention, excels in the head-floating property and excels in the track-separating ability and, owing to the avoidance of the influence of signal interference between the adjacent tracks, excels in the high recording density property.

BEST MODE FOR CARRYING OUT THE INVENTION

First, the cross-sectional structure of the discrete-type magnetic recording medium of this invention will be described.

Figure 1:
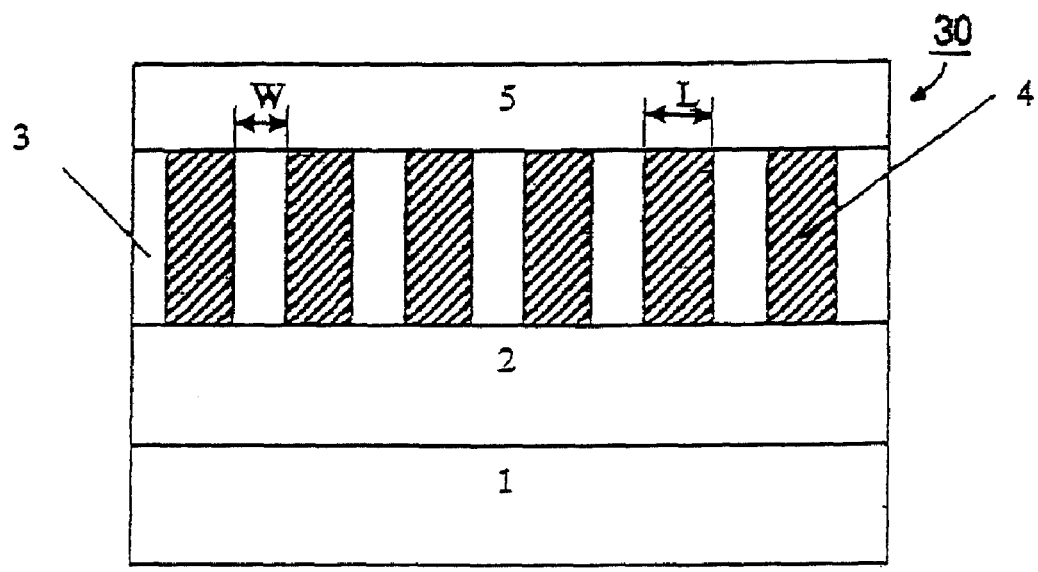
FIG. 1 is a cross section illustrating the structure of a magnetic recording medium of this invention.

FIG. 1 depicts the cross-sectional structure of the discrete-type magnetic recording medium of this invention. A magnetic recording medium 30 of this invention possesses a structure resulting from forming on the first surface of a nonmagnetic substrate 1 a soft magnetic layer and an intermediate layer 2, a magnetic layer 3 having a pattern magnetically formed thereon, an unmagnetized layer 4 and a protecting-film layer 5 and further forming on the outermost surface a lubricating film omitted from illustration.

For the purpose of heightening recording density, the magnetic layer 3 possessing a magnetic pattern prefers to have a magnet part width W of 100 nm or less and a nonmagnetic part width L of 200 nm or less. The track pitch P (=W+L), therefore, is decreased to the fullest possible extent in the range of 300 nm or less with the object of heightening the recording density.

As the nonmagnetic substrate for use in this invention, any of the nonmagnetic substrates, such as Al alloy substrates made of Al—Mg alloys having Al as a main component, or substrates made of ordinary soda glass, aluminosilicate-based glass, glass ceramics, silicon, titanium, ceramics and various resins may be optionally used. Among other materials enumerated above, Al alloy substrates, glass substrates made of glass ceramics, and silicon substrates are used particularly favorably. The substrate thus selected prefers to have an average surface roughness (Ra) of 1 nm or less, preferably 0.5 nm or less, and particularly preferably 0.1 nm or less.

The magnetic layer to be formed on the first surface of the nonmagnetic substrate of the quality mentioned above may be an in-plane magnetic recording layer or a vertical magnetic recording layer. For the purpose of realizing high recording density, however, it prefers to be a vertical magnetic recording layer. Preferably, the magnetic recording layer is formed of an alloy formed mainly of Co as a principal component.

As the magnetic recording layer for use in the in-plane magnetic recording medium, for example, a stacked structure that is composed of a nonmagnetic CrMo under layer and a ferromagnetic CoCrPtTa magnetic layer cab be utilized.

As the magnetic recording layer for use in the vertical magnetic recording medium, a multilayer that is composed of a backing layer made of soft magnetic FeCo alloy (such as FeCoB, FeCoSiB, FeCoZr, FeCoZrB, FeCoZrBCu or the like), FeTa alloy (such as FeTaN, FeTaC or the like) or Co alloy (such as CoTaZr, CoZrNB, CoB or the like), an orientation-controlling film made of Pt, Pd, NiCr, NiFeCr or the like, optionally an intermediate layer made of Ru or the like, and a magnetic layer made of a 60Co-15Cr-15Pt alloy or a 70Co-5Cr-15Pt-10SiO$_2$ alloy may be used.

The thickness of the magnetic recording layer is 3 nm or more and 20 nm or less, preferably 5 nm or more and 15 nm or less. The magnetic recording layer needs only to be so formed in conformity with the kind of magnetic alloy used and the structure of multilayer that the head may be enabled to gain sufficient output and input. The magnetic layer needs to have a film thickness of a certain degree or more for the purpose of obtaining an output of a prescribed degree or more during the course of reproduction. Meanwhile, the magnetic layer must be set at an optimum film thickness in view of the fact that the various parameters representing the recording and reproducing properties are generally deteriorated in proportion as the output increases.

Generally, the magnetic recording layer is formed as a thin film by the sputtering method.

The protecting-film layer 5 is formed on the first surface of the magnetic recording layer. For the protecting-film layer, such commonly used protective-film layer materials as carbonaceous substances including carbon (C), hydrogenated carbon (H$_x$C), carbon nitride (CN), amorphous carbon, silicon carbide (SiC), and the like, SiO$_2$, Zr$_2$O$_3$, TiN and the like are available. The protecting-film layer may be formed of two or more layers.

The film thickness of the protecting-film layer 5 must be less than 10 nm. If the film thickness of the protecting-film layer exceeds 10 nm, the excess will result in unduly enlarging the distance between the head and the magnetic layer and preventing the input and output signals from acquiring sufficient intensity. Generally, the protecting-film layer is formed by the sputtering method or the CVD method.

The protecting-film layer prefers to have the lubricating layer formed thereon. As the lubricating agent for use in the lubricating layer, fluorine-based lubricating agents, hydrocarbon-based lubricating agents, and mixtures thereof may be available, for example. The lubricating layer is generally formed in a thickness of 1 to 4 nm.

Next, the method for producing the discrete-type magnetic recording medium of this invention will be specifically described below.

The process for producing a magnetic recording medium normally begins with a work of cleaning and drying a substrate. This invention also prefers to perform the work of cleaning and drying the substrate prior to forming the magnetic-film layer from the viewpoint of ensuring adherence between the component layers. The substrate does not need to have its size particularly restricted.

This invention has a soft magnetic layer of FeCoB, an intermediate layer of Ru, a magnetic layer of a 70Co-5Cr-15Pt-10SiO$_2$ alloy and a protecting layer of carbon formed on the first surface of the substrate. Subsequently, a magnetic recording medium is produced by applying resist as a coating, forming a pattern via the coating, removing the resist and the Carbon remaining in the parts corresponding to the concaves in the pattern by reactive ion etching, depositing a coating of Si on the magnetic layer, then heating the coated magnetic layer or irradiating the Si surface with inert ions, thereby inducing diffusion of Si in the magnetic layer lying thereunder, causing Si to be diffused and alloyed in the magnetic layer, thereby forming a magnetic pattern designed in conformity with the distance between the adjacent tracks, removing the resist, thereby inducing re-formation of the protecting layer, and then applying a coating of lubricant. The sputtering method was adopted for the deposition of the coating of Si. For the irradiation with the ion beam, inert atoms, such as Ar and Kr, are available. This invention contemplates using Ar for the irradiation.

In the formation of the pattern subsequent to the application of resist as a coating, the concaves and the convexes are formed in the shape of tracks on the first surface of the protecting film by joining a stamper directly to the protecting layer to be deposited subsequent to the substrate or the magnetic layer and pressing the stamper under high pressure. Alternatively, it is permissible to form the pattern with concaves and convexes by utilizing a thermosetting resin or a UV-setting resin, for example.

As the stamper for use in the process, a metallic plate having a fine track pattern formed by a method, such as electron beam imaging, for example, may be used. The material of the stamper is required to possess hardness and durability capable of withstanding the impact of the process. Ni, for example, can be used. The material is only required to meet the purpose and the kind thereof is irrelevant. The stamper has formed thereon servo signal patterns, such as a burst pattern, a gray code pattern and a preamble pattern besides the tracks for recording ordinary data.

On the occasion of removing the resist, the resist on the surface and part of the protecting layer are removed by using a technique, such as dry etching, reactive ion etching or ion milling. In consequence of these treatments, the magnetic layer and part of the protecting layer on which the magnetic pattern has been formed remain. By selecting the conditions, the protecting layer may be completely removed and the magnetic layer having the pattern formed thereon may be allowed alone to remain.

For the purpose of forming the component layers of the magnetic recording medium except the protecting layer 5, the RF sputtering method and the DC sputtering method that are generally used as means to deposit a coating are available.

On the other hand, for the purpose of forming the protecting-film layer, generally the method of depositing a thin film of diamond-like carbon by means of P-CVD, for example, is adopted. This method, however, is not an exclusive means.

Figure 2:
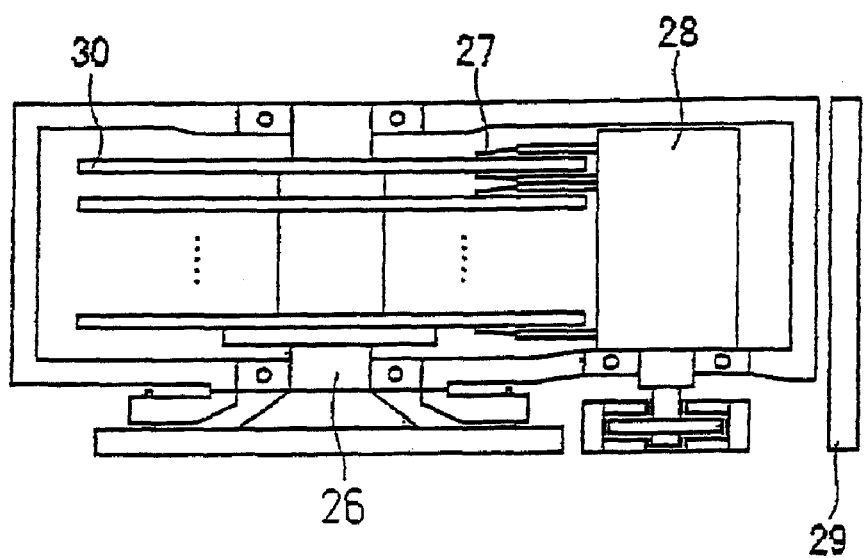
FIG. 2 is an explanatory view illustrating the structure of a magnetic recording and reproducing device of this invention.

Next, the structure of the magnetic recording and reproducing device of this invention is shown in FIG. 2. The magnetic recording and reproducing device of this invention is provided with the magnetic recording medium 30 of this invention, a medium-driving part 26 for driving the medium in the direction of recording, a magnetic head 27 consisting of a recording part and a regenerating part, a head-driving part 28 for moving the magnetic head 27 relative to the magnetic recording medium 30 and a recording and reproducing signal system 29 combining recording and reproducing signal-processing means for entering a signal into the magnetic head 27 and regenerating a signal produced from the magnetic head 27. By combining these components, it is made possible to configure a magnetic recording device possessing a high recording density. Owing to the physically discrete fabrication of the recording track of the magnetic recording medium, this invention enables the regenerating head and the recording head to be actuated in nearly the same widths, whereas the practice of eliminating the influence of the magnetization transition region of the track edge part by giving the regenerating head a smaller width than the recording head has prevailed to date. Consequently, it is made possible to obtain a satisfactory regeneration output and a high SNR.

Further, by forming the regenerating part of the magnetic with a Giant Magneto Resistive (GMR) head or a Tunneling Magneto Resistive (TMR) head, it is made possible to obtain satisfactory signal strength even at a high recording density and realize a magnetic recording device possessing a high recording density. By causing this magnetic head to float in an amount of 0.005 µm to 0.020 µm, i.e. to a smaller height than ever, it is made possible to enhance the output, permit production of the device with a high SNR, and provide the magnetic recording device of a large capacity and high reliability. The recording density can be further enhanced by incorporating in the combination a signal processing circuit conforming to the maximum likelihood decoding method. A satisfactory SNR can be obtained even in the case of performing a recording and reproducing operation at a track density of 100 k tracks or more per inch, a linear recording density of 1000 k bits or more per inch, and a recording density of 100 G bits or more per square inch.

Now, Examples of this invention and Comparative Examples will be described below.

COMPARATIVE EXAMPLE 1

A vacuum chamber having an HD-oriented glass substrate set therein was evacuated in advance to a vacuum of $1.0 \times 10^{-5}$ Pa or less. The glass substrate used herein was made of glass ceramic using $Li_2Si_2O_5$, $Al_2O_3$—$K_2O$, $MgO$—$P_2O_5$ and $Sb_2O_3$—$ZnO$ as components. It measured 65 mm in outside diameter and 20 mm in inside diameter and had an average surface roughness (Ra) of 2 Å.

On the glass substrate, a $SiO_2$ film was formed as a pre-emboss layer in a thickness of 200 nm by the ordinary RF sputtering method.

Next, the resultant coated substrate was imprinted by the use of stampers made of Ni and prepared in advance. The stampers had a track pitch of 100 nm. The grooves were invariably adjusted to a depth of 20 nm. The imprinting was implemented by using stampers of relevant designs.

Then, the $SiO_2$ layer was etched by means of ion-beam etching. The thin part of the $SiO_2$ layer was etched to a depth reaching the substrate, with the result that a pattern of concaves and convexes conforming to the irregularities formed by the stampers was formed on the first surface of the substrate.

On the first surface of the substrate, a soft magnetic layer of FeCoB, an intermediate layer of Ru and a magnetic layer of a 70Co-5Cr-15Pt-10SiO$_2$ alloy were stacked by the DC sputtering method and a C (carbon) protecting-film layer and a fluorine-based lubricating film were further stacked by the P-CVD method, sequentially in the order mentioned.

The FeCoB soft magnetic layer measured 600 Å, the Ru intermediate layer 100 Å, the magnetic layer 150 Å, and the C (carbon) protecting-film layer an average of 4 nm respectively in film thickness. This sample was obtained as an example of the embossed product of Comparative Example 1.

COMPARATIVE EXAMPLE 2

A vacuum chamber having an HD-oriented glass substrate set therein was evacuated in advance to a vacuum of $1.0 \times 10^{-5}$ Pa or less. The glass substrate used herein was made of glass ceramic using $Li_2Si_2O_5$, $Al_2O_3$—$K_2O$, $MgO$—$P_2O_5$ and $Sb_2O_3$—$ZnO$ as components. It measured 65 mm in outside diameter and 20 mm in inside diameter and had an average surface roughness (Ra) of 2 Å.

On the glass substrate, a soft magnetic layer of FeCoB, an intermediate layer of Ru and a magnetic layer of a 70Co-5Cr-15Pt-10SiO$_2$ alloy were stacked by the DC sputtering method and a C (carbon) protecting-film layer and a fluorine-based lubricating film were further stacked by the P-CVD method, sequentially in the order mentioned. The FeCoB soft magnetic layer measured 600 Å, the Ru intermediate layer 100 Å, the magnetic layer 150 Å, and the C (carbon) protecting-film layer an average of 4 nm, respectively in film thickness. Subsequently, the magnetic layer was subjected to a fabricating treatment to form a magnetic pattern thereon. To be specific, after a resist of thermosetting resin was applied to form irregularities conforming to a prescribed pattern, the concaved parts of the magnetic layer were removed by ion milling in the vacuum device, the remaining convexed parts of the resist were peeled, and a film of carbon was formed with the object of embedding the removed parts of the magnetic layer. Thereafter, carbon was deposited in the form of a film 4 nm in thickness by the P-CVD method to give rise to a lubricating member. The resultant surface was smoothed by means of ion-beam etching. The sample thus obtained was placed in a vacuum chamber evacuated in advance to a vacuum of $1 \times 10^{-4}$ Pa and Ar gas was introduced in the chamber till the partial pressure reached 5 Pa. The surface of the sample was etched by applying an RF voltage of 300 W to the sample. This sample was obtained as an example of the fabricated product of magnetic layer of Comparative Example 2.

In the embedding process, a nonmagnetic material is used as the object of embedment. In the manufacture of the present sample, $SiO_2$ was used. The production of the film adopted the sputtering technique.

EXAMPLES 1 TO 5

A vacuum chamber having an HD-oriented glass substrate set therein similarly to Comparative Example 2 was evacuated in advance to a vacuum of $1.0 \times 10^{-5}$ Pa or less. The glass substrate used herein was a glass ceramic that was composed of $Li_2Si_2O_5$, $Al_2O_3$—$K_2O$, $MgO$—$P_2O_5$ and $Sb_2O_3$—$ZnO$. It measured 65 mm in outside diameter and 20 mm in inside diameter and had an average surface roughness (Ra) of 2 Å.

On the glass substrate, a soft magnetic layer of FeCoB, an intermediate layer of Ru and a magnetic layer of a 70Co-5Cr-15Pt-10SiO$_2$ alloy were stacked by the DC sputtering method and a C (carbon) protecting-film layer and a fluorine-based lubricating film were further stacked by the P-CVD method, sequentially in the order mentioned. The FeCoB soft magnetic layer measured 600 Å, the Ru intermediate layer 100 Å, the magnetic layer 150 Å, and the C (carbon) protecting-film layer an average of 4 nm, respectively in film thickness. Thereafter, a magnetic pattern was formed by a magnetic layer processing treatment Specifically, a magnetic recording medium was produced by applying resist of a thermosetting resin, thereby forming concaves and convexes conforming to a pattern, removing only the resist existing in the concave parts by the reactive etching method, depositing a coating of Si by the sputtering method, then heating the coated magnetic layer, thereby causing the Si to be diffused in the magnetic layer and allowed to form a magnetic pattern designed in conformity with the distance between the adjacent tracks, subsequently removing the resist and the protecting layer, thereby re-forming a protecting layer 4 nm in thickness, and applying a lubricant as a coating. The samples thus manufactured represented Examples 1 to 5. The thicknesses of the Si films formed and the heating conditions adopted were as shown in Table 1 below.

EXAMPLES 6 TO 10

A vacuum chamber having an HD-oriented glass substrate set therein similarly to Comparative Example 2 was evacuated in advance to a vacuum of $1.0 \times 10^{-5}$ Pa or less. The glass substrate used herein was a glass ceramic that was composed of Li$_2$Si$_2$O$_5$, Al$_2$O$_3$—K$_2$O, MgO—P$_2$O$_5$ and Sb$_2$O$_3$—ZnO. It measured 65 mm in outside diameter and 20 mm in inside diameter and had an average surface roughness (Ra) of 2 Å.

On the glass substrate, a soft magnetic layer of FeCoB, an intermediate layer of Ru and a magnetic layer of a 70Co-5Cr-15Pt-10SiO$_2$ alloy were stacked by the DC sputtering method and a C (carbon) protecting-film layer and a fluorine-based lubricating film were further stacked by the P-CVD method, sequentially in the order mentioned. The FeCoB soft magnetic layer measured 600 Å, the Ru intermediate layer 100 Å, the magnetic layer 150 Å and the C (carbon) protecting-film layer an average of 4 nm, respectively in film thickness. Thereafter, a magnetic pattern was formed by a magnetic layer processing treatment Specifically, a magnetic recording medium was produced by applying resist of a thermosetting resin, thereby forming concaves and convexes conforming to a pattern, removing only the resist existing in the concave parts by the reactive ion etching, depositing a coating of Si by the sputtering method, then irradiating the Si surface with Ar ions of an ion beam, thereby causing the Si to be diffused in the magnetic layer and allowed to form a magnetic pattern designed in conformity with the distance between the adjacent tracks, subsequently removing the resist and the protecting layer, thereby re-forming a protecting layer 4 nm in thickness and applying a lubricant as a coating. The samples thus manufactured represented Examples 6 to 10. The thicknesses of the Si films formed and the heating conditions adopted were as shown in Table 1 below.

COMPARATIVE EXAMPLES 3 AND 4

Samples of Comparative Examples 3 and 4 were manufactured by following the same procedure as used in Examples 1 to 10 while omitting the heating subsequent to the deposition of the Si coating and the irradiation with Ar of ion beam. The Si films in the samples measured 50 Å and 300 Å, respectively.

The samples of Examples 1 to 10 and Comparative Examples 1 to 4 were evaluated for electromagnetic conversion characteristic by the use of a spin stand. In this evaluation, a vertical recording head was used for recording and a TuMR head for reading. The samples after having recorded a signal of 750 kFCI were tested for SNR value and 3T-squash. It was found that the samples of Examples 1 to 10 were substantially improved in RW properties, such as SNR and 3T-squash, as compared with the samples of Comparative Examples 1 and 2. It is inferred that this improvement resulted from stabilizing the head floatation property and consequently enabling RW to proceed at a prescribed height of floatation. On account of the confirmation of the RW properties, such as SNR and 3T-squash, it was also confirmed that the samples of Examples 1 to 10 allowed distinct separation of the adjacent tracks by a nonmagnetic part and as well, in accordance with the diffusion of Si, enabled a magnetic pattern comprising magnetic parts and nonmagnetic parts to be formed in the magnetic layer part thereof in conformity with a pattern of resist possessing the shape of concaves and convexes. On the other hand, the samples of Comparative Examples 3 and 4 were remarkably inferior in both SNR and 3T-squash to the samples of Examples 1 to 10.

After completion of the determination of the electromagnetic conversion characteristic, the samples of Examples 1 to 10 and Comparative Examples 1 to 4 were tested for surface roughness by the use of AFM. The nonmagnetic substrates produced in the Examples and the Comparative Examples for use in a vertical recording medium were evaluated for roughness (Ra) in a visual field of 10 μm with an AFM made by Digital Instruments Corp. The evaluation used a resolution of 256×256 tapping mode and a sweep rate of 1 μm/second. The results of the evaluation are shown in Table 1 below. The samples of Examples 1 to 10 showed markedly low magnitudes of surface roughness as compared with the samples of Comparative Examples 1 and 2. It is inferred that this improvement resulted in stabilizing the head floatation.

The samples of Examples 1 to 10 and Comparative Examples 1 to 4 were evaluated for glide avalanche property. The evaluation was performed in a device made by Sony/Tektronix Corp and sold under the product code of "DS4100" by the use of a 50% slider head made by Glideright Hardware Corp. The results of the evaluation are shown in Table 1 below. It is clear that Examples 1 to 10 excelled Comparative Examples 1 and 2 in head-floating property because of low glide avalanche.

The comparison of Examples 1 to 10 with Comparative Examples 1 to 4 has made it clear that this invention enables convenient production of a discrete medium exhibiting sufficiently low surface roughness and producing stable head floatation by causing an Si-containing alloy to be formed in the nonmagnetic part aimed at physically separating a pattern. As this comparison of the Examples and the Comparative Examples clearly shows, the production so implemented as to lower the surface roughness to the fullest possible extent forms an important factor for the sake of stabilizing the head floatation. This invention prefers to fix surface roughness at Ra≦2 nm and more favorably at Ra≦1.5 nm. It is evident that this invention serves as an effective means for separating patterned nonmagnetic and magnetic layers and further for producing a patterned medium aimed at still higher recording density than the discrete method.

TABLE 1

|  | Si film thickness (nm) | Heating Temperature (Ex. 1 to Ex. 5) | Ion beam Ar accelerated V/irradiation time | SNR (dB) | 3T-squash | Ra (nm) | Glide avalanche |
|---|---|---|---|---|---|---|---|
| Ex. 1 | 10 | 200° C. | None | 11.9 | 80.3 | 0.4 | 6.0 |
| Ex. 2 | 100 | 200° C. | None | 12.3 | 83.2 | 0.4 | 5.3 |
| Ex. 3 | 500 | 200° C. | None | 12.7 | 85.7 | 0.6 | 6.2 |
| Ex. 4 | 500 | 100° C. | None | 13.6 | 87.3 | 0.7 | 6.9 |
| Ex. 5 | 1000 | 200° C. | None | 12.0 | 89.2 | 0.8 | 7.0 |
| Ex. 6 | 10 | None | 500 eV/120 sec. | 12.1 | 82.2 | 0.3 | 5.5 |
| Ex. 7 | 100 | None | 500 eV/120 sec. | 12.6 | 83.3 | 0.8 | 6.9 |
| Ex. 8 | 500 | None | 500 eV/120 sec. | 12.9 | 83.2 | 0.7 | 6.1 |
| Ex. 9 | 500 | None | 1000 eV/120 sec. | 12.1 | 76.8 | 0.8 | 5.9 |
| Ex. 10 | 1000 | None | 500 eV/120 sec. | 12.1 | 78.5 | 0.5 | 5.5 |
| Comp. Ex. 1 | None | None | None | 6.5 | 54.3 | 10.0 | 13.4 |
| Comp. Ex. 2 | None | None | None | 10.1 | 67.9 | 2.8 | 10.0 |
| Comp. Ex. 3 | 10 | None | None | 9.1 | 66.8 | 0.5 | 6.1 |
| Comp. Ex. 4 | 500 | None | None | 9.7 | 69.3 | 0.4 | 5.8 |

INDUSTRIAL APPLICABILITY

This invention enables provision of a magnetic recording medium that permits securing the stability of head floatation, possesses an excellent ability to separate tracks, avoids being influenced by the signal interference between the adjacent tracks and excels in high recording density property. Further since the invention permits omission of a dry etching step necessary for the magnetic layer processing magnetic layer, it greatly enhances the productivity of the magnetic recording medium.

Since this invention provides the magnetic recording medium that excels in the head-floating property, manifests a very good ability to separate tracks and avoids succumbing to the influence of the signal interference between the adjacent tracks, it is further capable of providing a magnetic recording and reproducing device exhibiting an excellent high recording density property.

The invention claimed is:

1. A method for the production of a discrete track-type magnetic recording medium provided on at least one side of a nonmagnetic substrate with a magnetic recording track and a servo signal pattern which physically separated, comprising the steps of:

forming an Si film on a magnetic layer;

heating the resultant magnetic layer or irradiating a surface of the Si film with insert ions to diffuse Si in the magnetic layer, thereby forming in the magnetic layer a nonmagnetic part of a nonmagnetic alloy containing Si for physically separating the magnetic recording track and the servo signal pattern.

* * * * *